United States Patent [19]

Schnell

[11] 4,373,276
[45] Feb. 15, 1983

[54] DEVICE FOR CONVEYING A SLURRY, SUCH AS SAND OR GRAVEL OR THE LIKE, LYING UNDER WATER

[75] Inventor: Ludwig L. Schnell, Aufhausen, Fed. Rep. of Germany

[73] Assignee: Schuttgutfordertechnik AG, Fed. Rep. of Germany

[21] Appl. No.: 235,318

[22] Filed: Feb. 17, 1981

[30] Foreign Application Priority Data

Feb. 15, 1980 [DE] Fed. Rep. of Germany ....... 3005669

[51] Int. Cl.³ .............................................. E02F 3/88
[52] U.S. Cl. .......................................... 37/61; 37/64;
37/66; 37/72; 137/355.16; 141/392; 138/106;
285/302; 299/9; 406/193
[58] Field of Search ................ 141/392, 279, 382–388;
138/103, 106, 107, 110, 120, 121, 155, 178;
285/31, 62, 239, 252, 302; 137/355.12, 355.16,
355.2; 239/195, 198; 406/191–196; 37/61, 64,
66, 72, 58; 299/8, 9

[56] References Cited

U.S. PATENT DOCUMENTS

| 3,474,549 | 10/1969 | Schnell | 37/61 |
| 3,748,760 | 7/1973 | Schnell | 37/58 |
| 4,094,548 | 6/1978 | Schnell | 37/58 |
| 4,223,702 | 9/1980 | Cook | 138/106 |

*Primary Examiner*—Houston S. Bell, Jr.
*Attorney, Agent, or Firm*—Leydig, Voit, Osann, Mayer & Holt, Ltd.

[57] ABSTRACT

A dredger device for conveying sand or gravel or the like lying under water in which the material enters a conveyor head and is conveyed through a variable length tube into a receptacle on the dredger. In the interior of the variable length tube there is a flexible tube having one end connected to the conveyor head and the other end connected to a hose reel. The conveyed material travels through the interior tube to the hose reel and through an opening therein to a receptacle.

14 Claims, 9 Drawing Figures

DEVICE FOR CONVEYING A SLURRY, SUCH AS SAND OR GRAVEL OR THE LIKE, LYING UNDER WATER

DESCRIPTION OF THE INVENTION

This invention relates generally to a device for conveying a slurry, in particular sand or gravel or the like lying under water, in which the material enters a conveyor head and is conveyed onward through a telescopic tube connected with the conveyor head, variable in length and supported against axial twisting.

In known devices of this type, such as is disclosed in German Pat. No. 23 55 831, it is difficult to seal the sections of the telescopic tube which slide into one another, in particular at the guide locations, in order to protect them from wearing down caused by the conveyed material. Furthermore, in such devices, there is the disadvantage that the cross section of the telescopic tube becomes greater section by section moving upward from the conveyor head, so that increased energy is required to convey the material which is standing under pressure through the tube.

It is an object of the invention, to provide a device of this type having increased resistance to wear as well as improved sealing, and, simultaneously, to save conveyance energy by comparison to known devices.

This object is met in accordance with the present invention by the provision in the interior of the telescopic tube, a flexible tube, one end of which is connected with the conveyor head and the other end of which is connected with a hose reel.

For further explanation of the invention, a specific exemplary embodiment thereof shall be described below, in connection with the appended drawings, in which.

Figure 1:
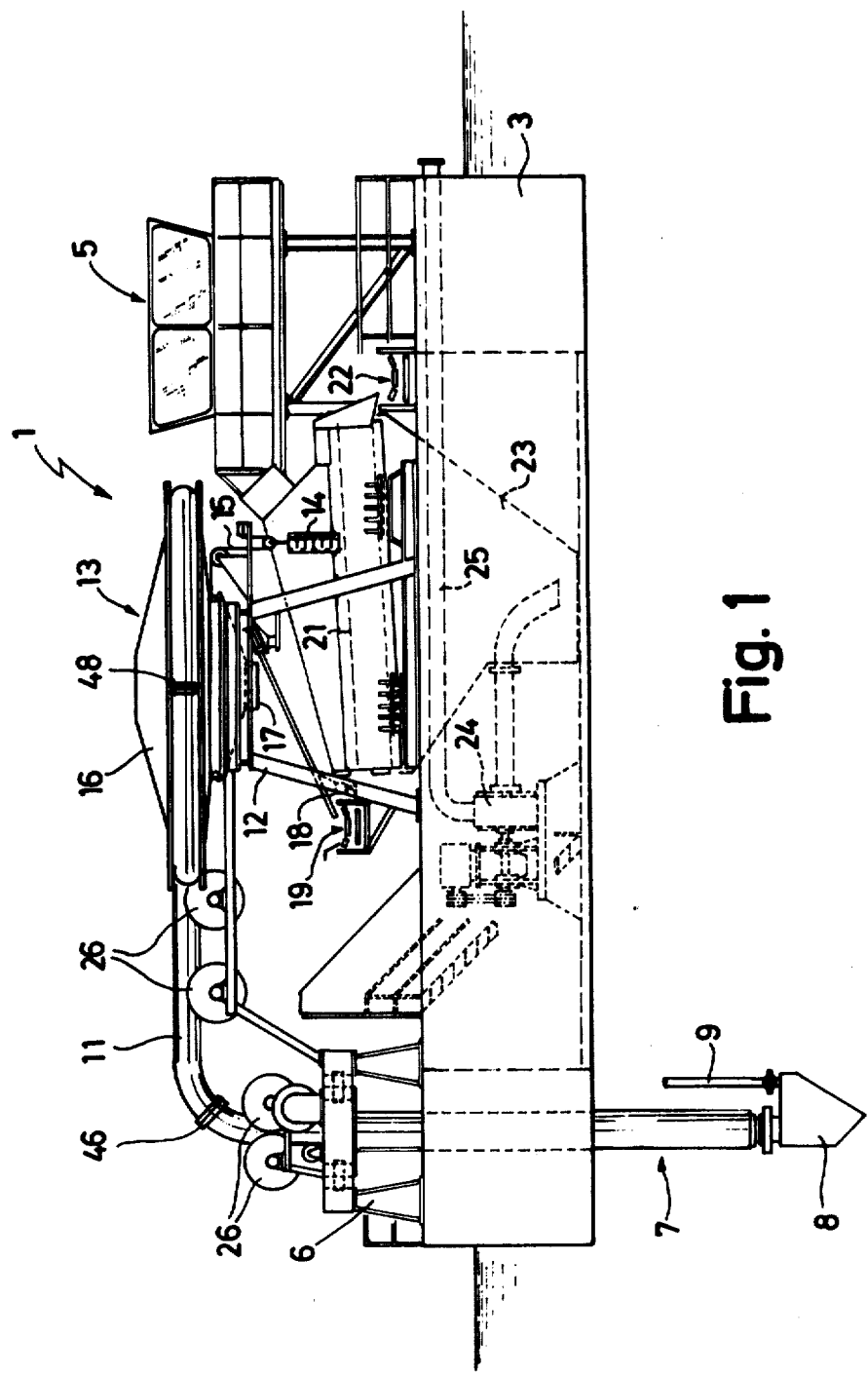
FIG. 1 shows a schematic side view of a dredger device with a telescopic tube.
Figure 2:
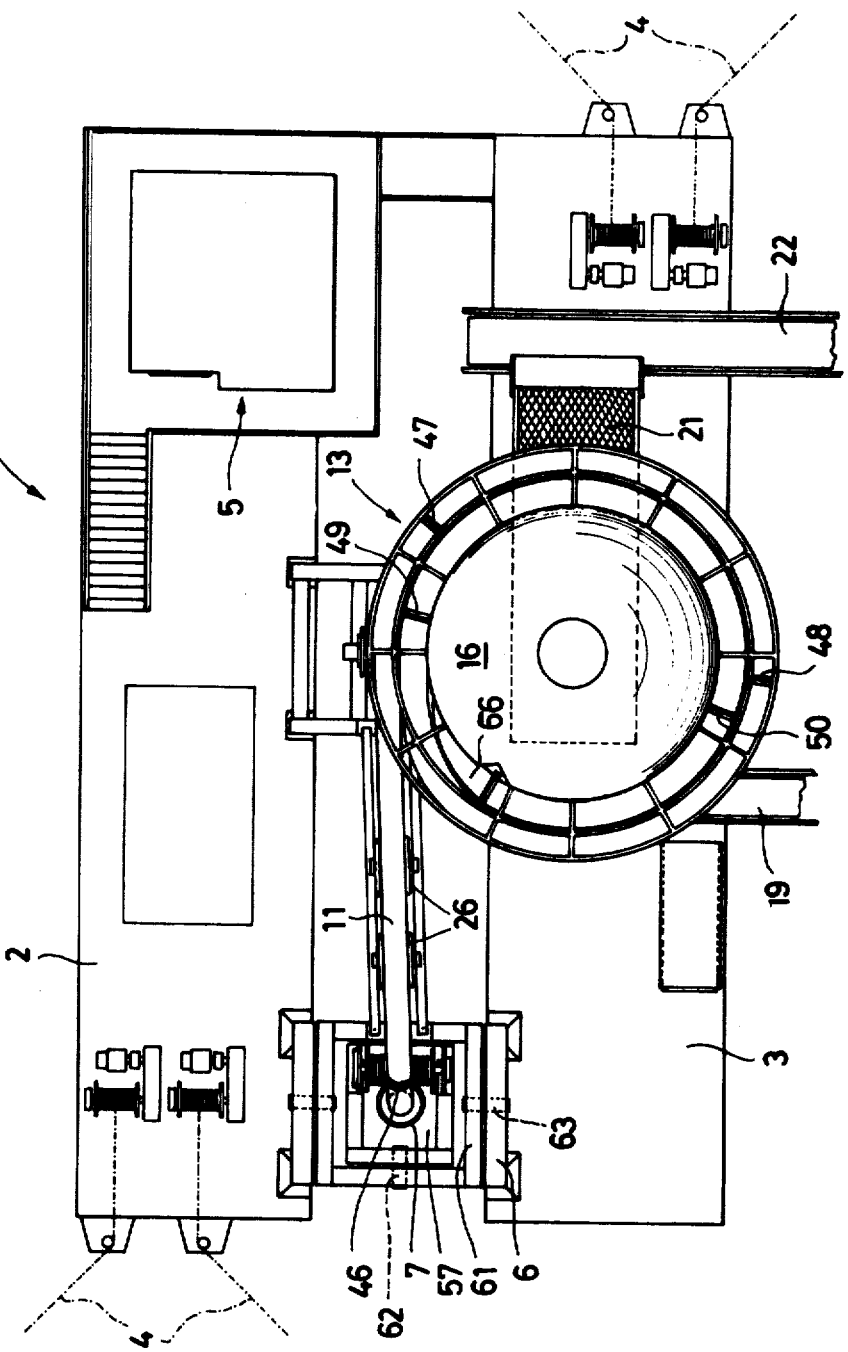
FIG. 2 is a plan view of the device of FIG. 1.

The dredger device 1 shown in FIGS. 1 and 2 includes a floating body having two pontoons, 2, 3 joined with one another which can be anchored by cables 4 on the surface of a body of water such as a dredge lake or in the sea. The dredger further concludes a control house, or wheel house, 5 from which the necessary commands and operational signals may be conducted to the appropriate operating points on the dredger utilizing conventional remote control lines.

On a bearing block 6, mounted on the pontoons, there is carried, in a manner to be described more particularly hereinafter, a telescopic tube 7 made up of several sections slidable in one another, which, as shown in FIG. 2, descends into the water between the two pontoons 2, 3 and is connected at its lower end with a conveyor head 8 of conventional construction. A slurry of bulk material lying under the water, for example, gravel, sand, or the like, is taken up by the conveyor head 8 and conveyed to the surface of the water.

In order to receive the pourable material the conveyor head 8 is placed on the bottom of the water in a conventional manner. As is also conventional, a pressure line 9 is connected to the conveyor head 8, which serves to feed in a pressure medium, for example compressed air or pressurized water. The upper end (not shown in FIG. 1) of the line 9 is connected on the dredger device 1 with a compressor for the generation of the desired pressure. Through the action of the pressure medium coupled to the conveyor head 8, the material to be conveyed is conveyed from the conveyor head through the telescopic tube 7 to the dredger device 1.

As is apparent from FIGS. 1 and 2, from the upper end of the telescopic tube 7 there emerges a flexible tube 11 which is windable onto a hose reel 13 rotatably mounted on a bearing stand 12. Beneath the hose tube-receiving portion of the hose reel, there is connected around the hose reel a cable 15 loaded with a counter weight 14. The counterweight 14 tends to urge the cable drum clockwise, as viewed in FIG. 2, and thereby to wind up the tube 11 or to oppose its unwinding with a corresponding counterforce.

The free end of the hose tube 11, located on the inside of the hose reel, is coupled, as shall also be described in more detail hereinafter, into a baffle container 16. The baffle container 16 receives the bulk material coming from the conveyor head 8 and the telescopic tube 7, which is fed in through the tube 11. From a centrally located outlet opening 17 of the conically formed baffle container 16, the conveyed bulk material, mixed with water, falls onto a first sieve 18, preferably mechanically shaken, which serves to separate the coarse grain. The coarse bulk material passes from the sieve 18 onto a conveyor belt 19, which conveys it onward to a desired location. Bulk material with a medium granulation remains on a similarly mechanically driven shaker sieve 21 and is transported onward to a conveyor belt 22. Fine bulk material, for example sand and water, pass through the sieve 21 into a collecting container 23. A pump installation 24 serves to convey the sand and water mixture onward from the container 23 over a line 25 to a cyclone separator, not shown, which can be located, for example, on a similar floating body. The dredger device 1 further includes in various places rotatably mounted rolls 26 which serve to guide the hose tube 11.

The flexible tube 11 is connected at its end distal from the hose reel 13 with the conveyor head 8, and as the sections of the telescopic tube 7 are slid apart or together, the flexible tube 11 is unwound or wound on the hose reel 13 in a corresponding amount. Therefore, in any event, independent of the effective length of the telescopic tube 7, there is a direct connection of the hose 11 between the conveyor head 8 and the baffle container 16.

Figure 3:
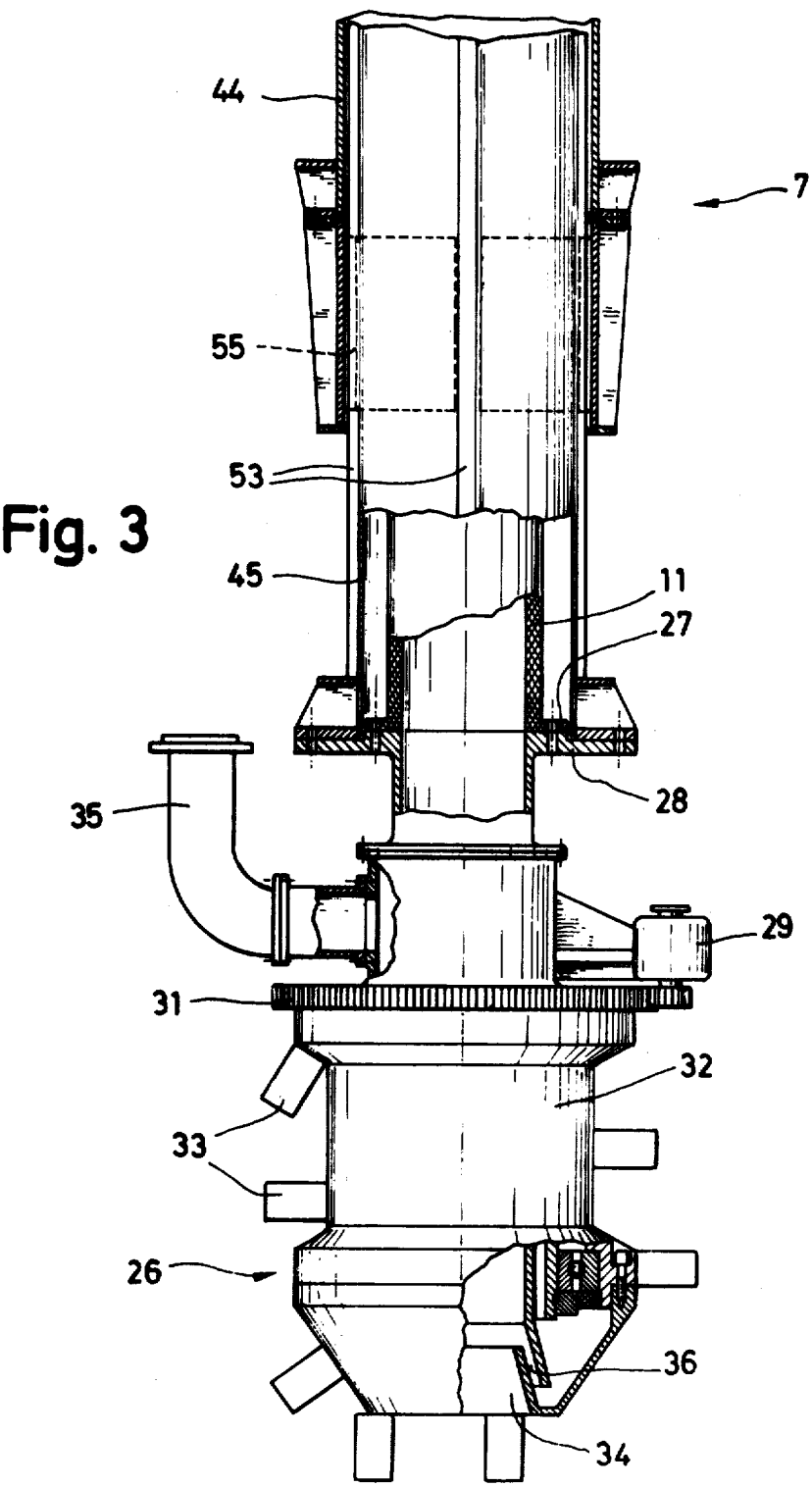
FIG. 3 is a partial view of the telescopic tube with connected conveyor head.

In FIG. 3 there is illustrated the connection of the hose tube 11 with a preferred embodiment of a conveyor head 8. As shown, on the end of the flexible tube 11 there is formed a flange 27 which is connected tightly to a flange 28 of the conveyor head 8 by screws. Shims may be added to provide an appropriate tight connection. The conveyor head 8 is constructed as a "rotary head", which is well known and need not be described in detail.

Briefly, the conveyor head 8 has an outer shell 32 turnable by an electric motor 29 over a toothed rim 31, on which shell 32 there are arranged cutting members 33 for loosening the bulk material which is to be conveyed from the bottom of the water. The bulk material to be conveyed enters the head 8 through an inlet opening 34. The pressure medium required to convey the bulk material to the surface of the water is fed in through a connecting pipe 35, which is connected to the line 9 (FIG. 1). The pressure medium enters over a gap 36 in the vicinity of the inlet opening 34 into the conveyor head. The pressure medium then carries a mixture of the bulk material and water with it upward into the tube 11 and then to the water surface and into the baffle container 16.

Figure 4:
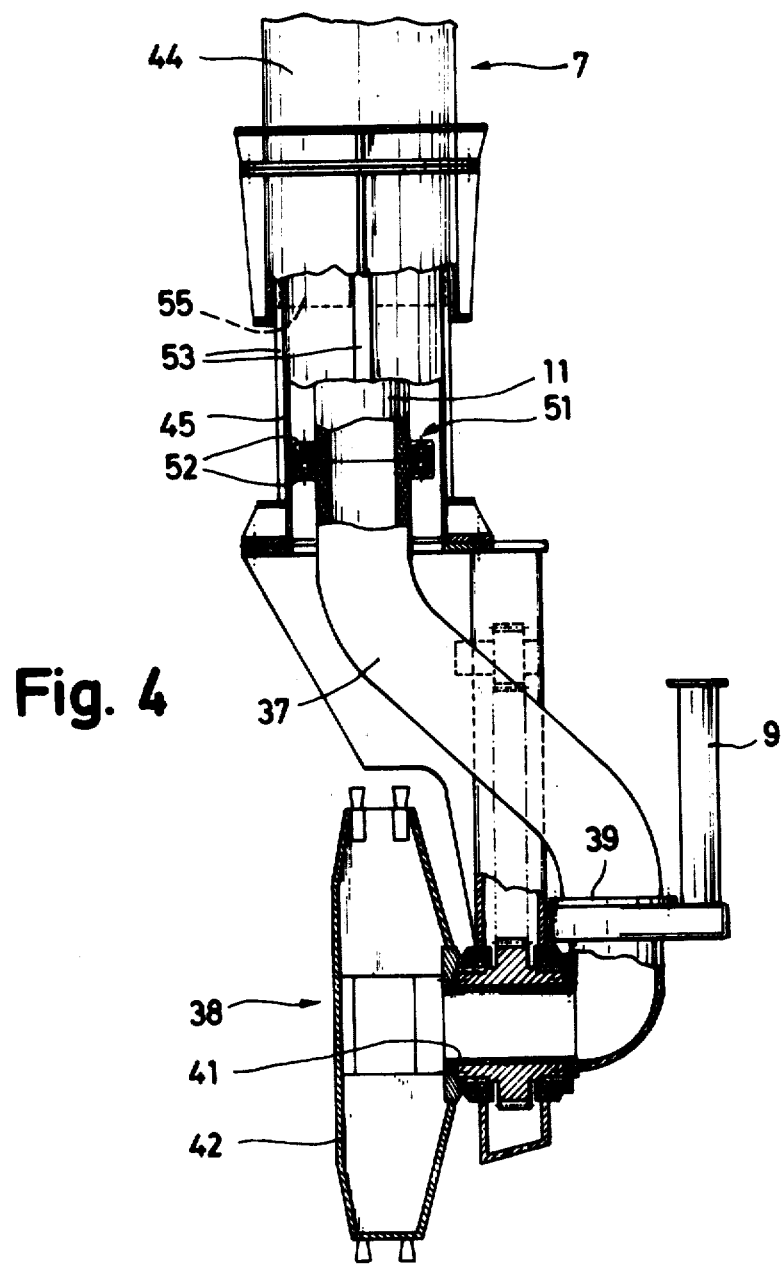
FIG. 4 is a view similar to FIG. 3 showing another conveyor head.

In FIG. 4 there is illustrated an alternative embodiment 8' for the conveyor head. As shown in FIG. 4 the flexible tube 11 guided in the telescopic tube 7 is connected with an additional hose piece 37, which at its opposite end is flanged and connected to the conveyor head 8' by means of a flange 39. The manner of connection is the same as that described previously for the flanges 27 and 28 of FIG. 3.

The conveyor head 8' is of conventional construction. At its inlet opening 41 there is arranged a blade wheel 42 driven by a hydraulic motor, which is turnable about an axis running transverse to the axis of the telescopic tube 7. The pressure medium is introduced over the line 9, a portion of which is shown in FIG. 4, and into the conveyor head 8'. In other respects, the conveyor head shown in FIG. 4 functions similarly to that of FIG. 3. The connection of the flexible tube 11 to the hose piece 37 shall be described in more detail hereinafter.

Figure 5:
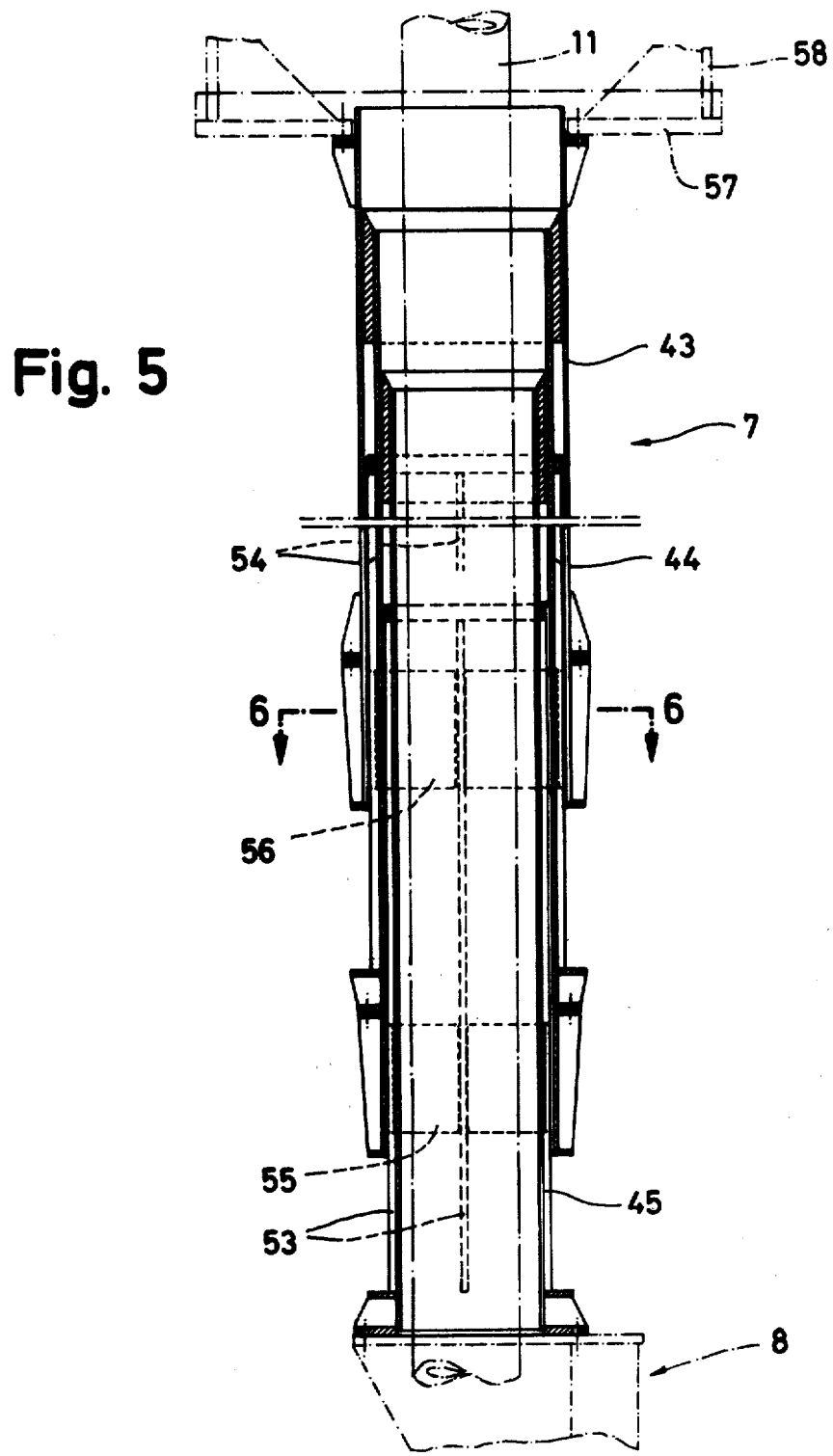
FIG. 5 is a more detailed view of the telescopic tube.

With reference now to FIG. 5, the structure of the telescopic tube 7 is shown in more detail. The telescopic tube 7, in the exemplary form shown, has three sections, 43, 44 and 45 telescoping into one another. The outermost, upper section 43 is attached at its upper end to the bearing stand 6 (FIG. 1). The innermost section 45, which has the smallest diameter of the sections, is rigidly attached to the conveyor head 8. Between the sections 43 and 45 there may be theoretically arranged an arbitrarily large number of intermediate sections 44. The inside diameter of the lowest section 45 is greater than the outside diameter of the hose tube 11 so that the hose tube runs freely everywhere within the telescopic tube 7. When the telescopic tube 7 is drawn apart, as already described, a corresponding hose 11 length must be unwound from the hose reel 13. When the sections of the telescopic tube 7 are slid together, a corresponding length of the hose 11 must again be wound onto the reel 13.

As is apparent from FIG. 5, the bulk material conveyed in the flexible tube 11 nowhere comes in direct contact with the inside wall of the telescopic tube 7. As a result, the inside wall is subject to no wear and does not need to be sealed off especially in regard to the pressure medium driving the bulk material upward, since the flexible tube 11 is by its construction enclosed. The flexible tube 11 may be made of rubber or plastic and can be produced commercially in a usual manner of a wear proof material such as "armored" or reinforced hose. In such a hose, the base material is either plastic or rubber reinforced by metal inlays or inlays of other material such as metal fabric. The diameter of the flexible tube is preferably greater than 20 centimeters, but tubes of smaller diameter are also possible.

Flexible tube 11 in its preferred form is made up of several parts joined to one another as indicated in FIGS. 1 and 2 by the connecting locations 46, 47, 48, 49 and 50. These hose parts have a length of several meters and may be joined to one another to produce any desired length of the flexible hose 11. The shape of the guide rolls 26 and the width of the hose-receiving portion of the hose reel 13 are such that the connecting locations do not present obstacles in the winding and unwinding of the hose. The connections themselves are formed in a manner as represented in FIG. 4 at the location 51. Each partial piece of the tube 11 presents at each of its ends a flange similar to the flange 27 of FIG. 3. This flange is joined in each case with the corresponding flange of a following hose piece by screws. At each connection point it is also possible to apply shims to the outside of the flanges. The shims may consist of semicircular partial rim pieces provided with holes. Such shims are designated in FIG. 4 as 52. Since the material of the tube 11 and of the flanges at each end of a hose piece is flexible and elastic, when joining two parts of the hose there are no sealing problems of any kind.

In the slurried bulk material conveying device according to the invention, the telescopic tube 7 and the flexible tube 11 serve different functions. The telescopic tube 7 serves to mount and support the conveyor head 8. If this conveyor head, as represented for example in FIGS. 3 and 4, is constructed as a rotary head, then the telescopic tube 7 serves also as a torque support. These functions cannot be fulfilled by the tube 11 because of its elastically yielding, flexible structure. The tube 11 serves, however, to provide the pressure-tight and wear-proof conveyance means for the bulk material which is received from the conveyor head 8, so that the telescopic tube 7 does not need to be pressure-tight and wear-proof, which characteristics, as mentioned earlier, are difficult to achieve in such a telescopic tube.

Figure 6:
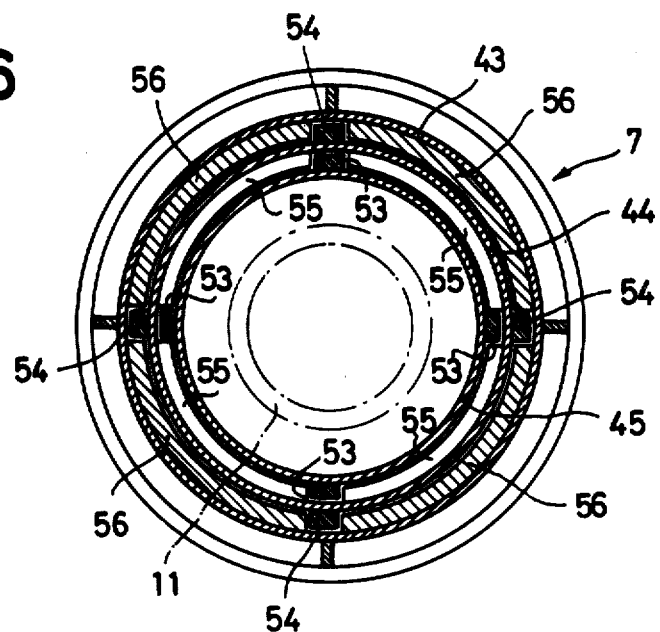
FIG. 6 is a sectional view taken along the line 6—6 in FIG. 5.

The telescopic tube 7 contains, in a known manner and therefore not represented in detail herein, stops for the individual sections so that these are slid apart only to such an extent that the tube retains its requisite rigidity. With reference to FIG. 5 and also to FIG. 6, there is shown the manner in which the individual sections 43-45 of the telescopic tube are held untwistable relative to one another. In order to accomplish this, on the outside of the sections 44, 45 there are arranged strips 53, 54 running axially along the tube sections. These strips run in each case between horizontally arranged straps 55, 56, which are secured to the inner walls of the sections 44 and 43 and extend axially therealong. The straps 55, 56 define intermediate spaces corresponding to the strips 53, 54 spaced about a quarter circle apart to permit free passage by the strips 53, 54. The strips 53, 54 run substantially in each case over the entire length of the associated tube section. The straps 55, 56 are provided along certain intervals of their associated tube section, there being provided on each tube section at least two such straps.

Figure 7:
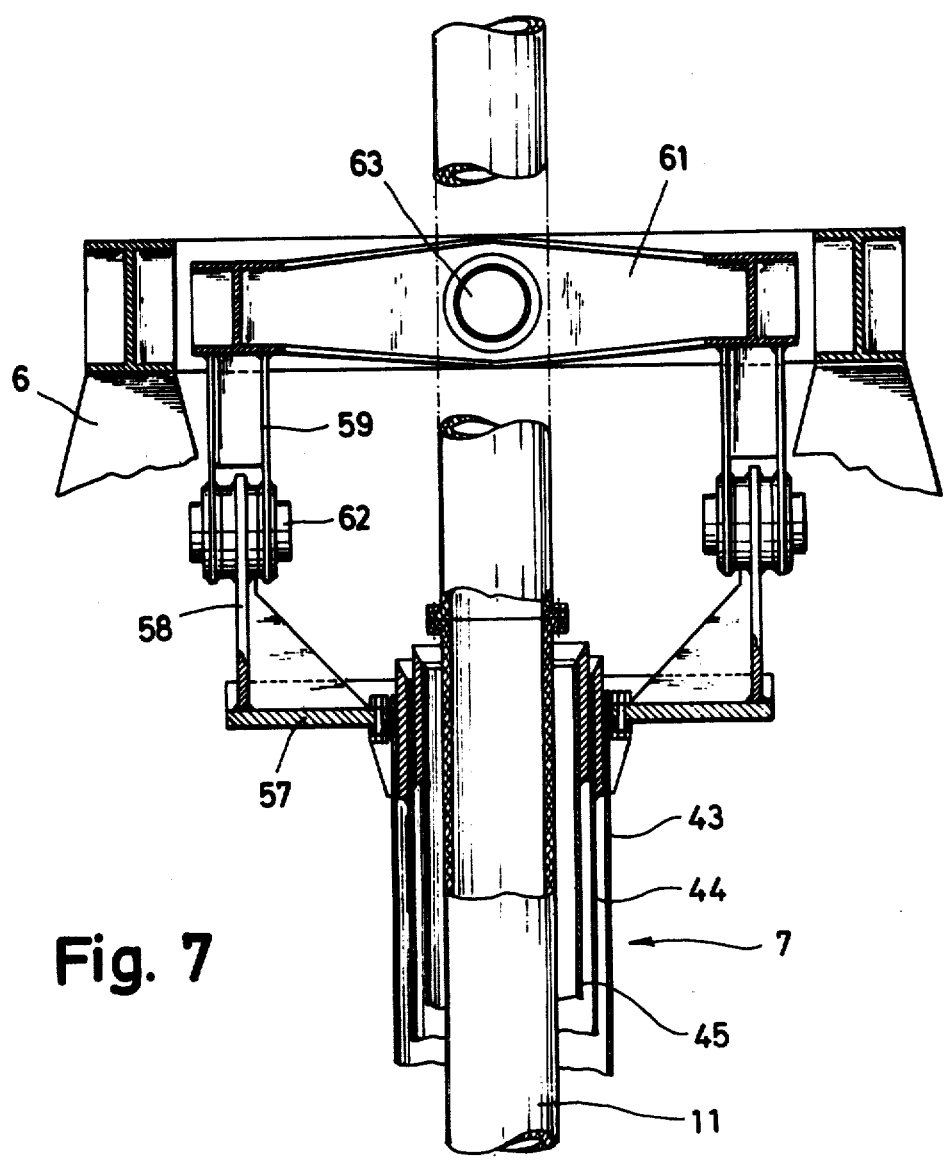
FIG. 7 is a more detailed view of a swivel joint for the conveyor tube.

In FIG. 7 there is illustrated the swingable mounting of the telescopic tube 7 on the bearing block 6. As shown, the uppermost tube section 43 of the telescopic tube 7 which has the greatest diameter of the tube sections, is rigidly attached to a yoke 57 from which two shanks 58 project upwardly. The shanks 58 are articulately joined with shanks 59, which project downwardly from a further yoke 61. Joint bolts 62 join the shanks 58 with the shanks 59. In this manner the telescopic tube 7 is pivotable in a plane which lies perpendicular to the plane of FIG. 7.

The upper yoke 61, which surrounds the flexible tube 11 in the form of a frame, is pivotally mounted on two oppositely disposed joint bolts 63 on the bearing block 6. In this manner the telescopic tube 7 may be rotated in the plane of FIG. 7. Together, the joints 62, 63 provide a universal pivotability of the telescopic tube 7 about two axes perpendicular to one another which run in a plane lying perpendicular to the tube axis.

In order to slow the bulk material conveyed through the tube 11, which arrives at a high velocity at the water surface, there is arranged at the outlet of the conveyance line the baffle container 16 (FIG. 1). It has been found that residual turns of the flexible tube 11 which remain on the hose reel in the case of a partially extended telescopic tube 7 suffice to deflect and to brake the conveyed bulk material. It is generally sufficient to have approximately a quarter turn of the flexible hose 11 on the reel to serve this purpose.

Figure 8:
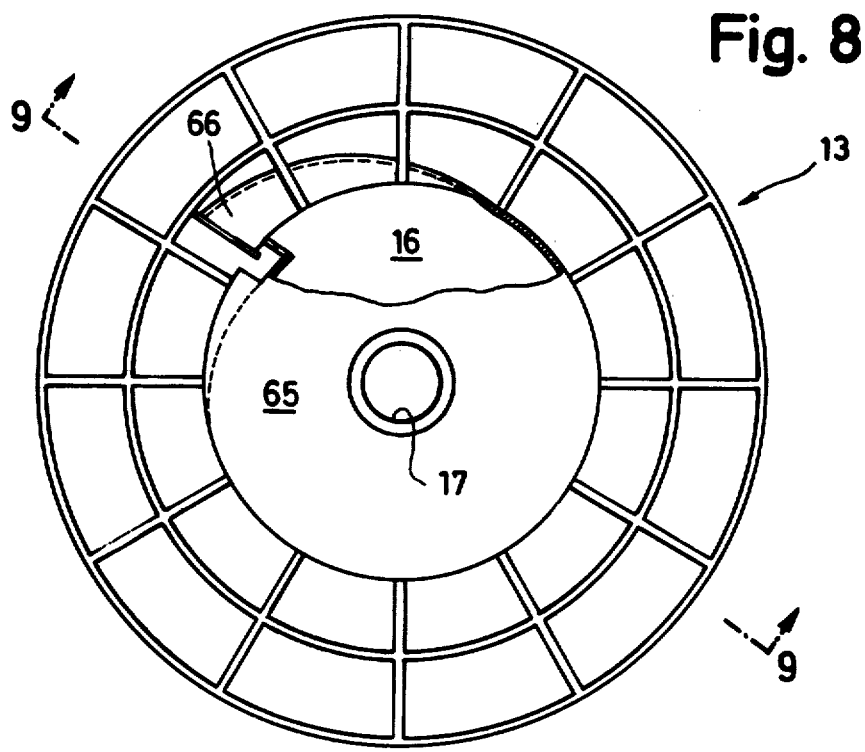
FIG. 8 is a plan view of a hose reel.
Figure 9:
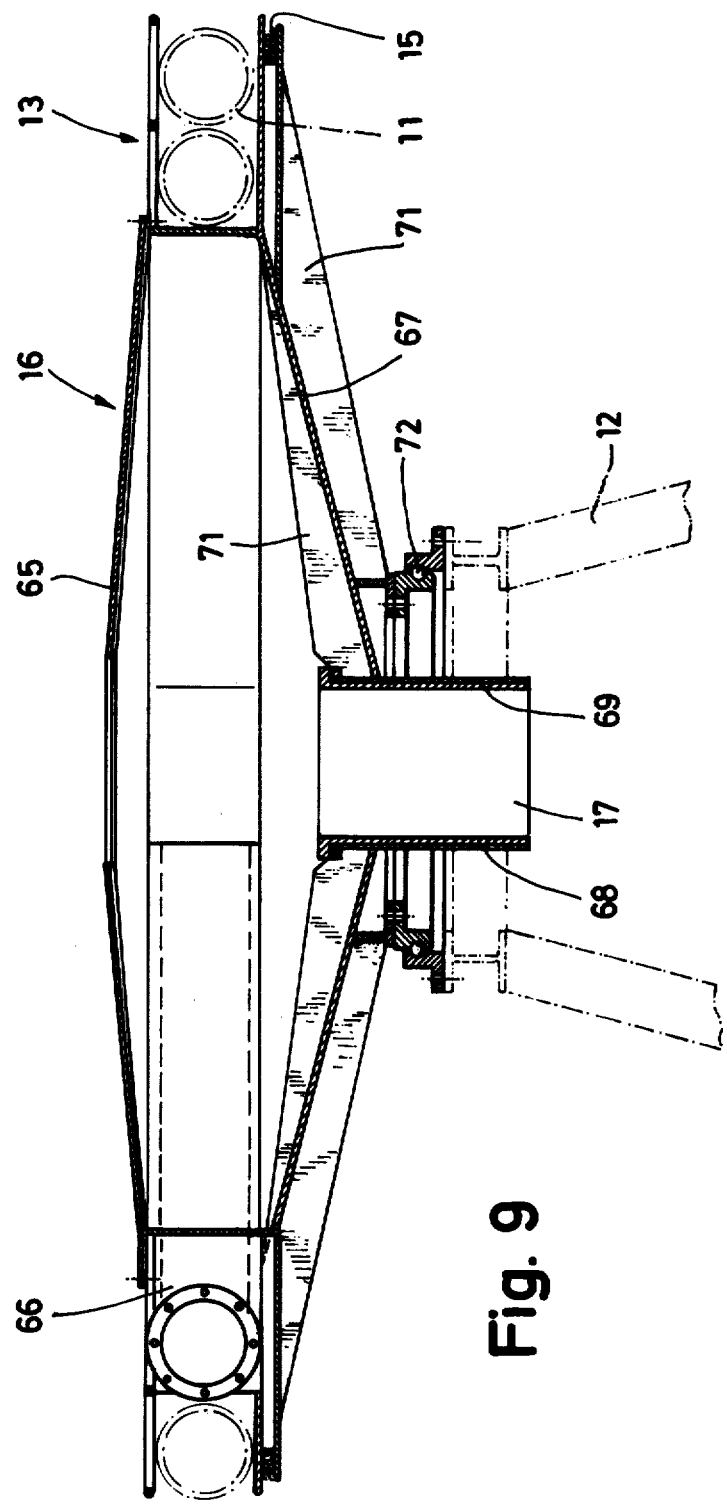
FIG. 9 is a sectional view of the hose reel of FIG. 8 taken along the line 9—9.

A first deflection and braking of the bulk material takes place, in addition, in the hose arc between the bearing block 6 and hose reel 13. In FIG. 1 this section is in the vicinity of the connecting location 46. As shown in FIGS. 8 and 9 the baffle container 16 is constructed as a truncated-connical vessel covered with a cover 65. The container 16 is provided on its upper edge with a tube connecting piece 66 introduced into the baffle container with a substantially tangential orientation. The end of the last section of the flexible tube 11 is attached at its flange tightly to this tube connecting pipe. The conveyed slurry therefore is introduced tangentially into the baffle container 16, braked, and deflected to the bottom of the container 67.

The inside of the baffle container 16, and if necessary the inside of the cover 65, are provided with a wear guard, preferably rubber lined. As is evident from FIG. 9, an outlet tube 68, which carries on its inside a wear guard, such as a rubber layer 69, projects upward above the bottom 67 of the baffle container 16. There is thus yielded a collecting space for conveyed bulk material on the bottom 67 of the baffle container 16, which collecting space is reinforced with radially extending struts 71. In the spaces above the bottom 67 of the container 16 there accumulates a residue of the conveyed bulk material which is unable to reach the outlet tube 68. This residue of bulk material acts as wear protection, since newly conveyed bulk material falls upon this residue layer without itself presenting any wear to the bottom 67 of the container.

In the particular form disclosed, as best shown in FIG. 9, the hose reel 13 and baffle container 16 are joined together into a common unit, which is carried as a whole on the bearing stand 12 in ball bearings 72. In an alternate form of construction, the baffle container 16 may be arranged in a stationary fashion on the bearing stand 12 and only the hose reel 13 constructed as a rotatable part.

What is claimed is:

1. Dredging apparatus for conveying bulk material such as sand, gravel or the like lying under water, said apparatus comprising the combination of
a dredger body,
a telescopic tube having a plurality of sections telescoping into one another, the upper end of said telescopic tube being fixed to said dredger body,
a conveyor head attached to the lower end of said telescopic tube for collecting bulk material and directing it into said telescopic tube,
a flexible hose of fixed length extending through the interior of said telescopic tube and permitting telescoping movement of said tube sections thereover, and
a hose reel mounted on said dredger body and connected to the upper end of said hose for winding and unwinding said hose during telescoping movement of the sections of said telescopic tube.

2. The dredging apparatus of claim 1 in which the flexible hose comprises several hose sections connected with one another at their ends.

3. The dredging apparatus of claim 1 which includes a baffle container for receiving bulk material from the upper end of said hose.

4. The dredging apparatus of claim 2 which includes a baffle container for receiving bulk material from the upper end of said hose.

5. The dredging apparatus of claim 3 in which the baffle container and the hose reel are commonly rotatable.

6. The dredging apparatus of claim 4 in which the baffle container and the hose reel are commonly rotatable.

7. The dredging apparatus of claim 3 in which the inside of the baffle container is rubber lined for wear protection.

8. The dredging apparatus of claim 4 in which the inside of the baffle container is rubber lined for wear protection.

9. The dredging apparatus of claim 5 in which the inside of the baffle container is rubber lined for wear protection.

10. The dredging apparatus of claim 6 in which the inside of the baffle container is rubber lined for wear protection.

11. The dredging apparatus of any of claims 3, 4, 5, 6, 7, 8, 9 or 10 in which the baffle container has a bottom inclined conically inwardly, terminating in an outlet which is defined by a wall extending upwardly beyond the lowermost area of the bottom of the container.

12. Dredging apparatus for conveying bulk material such as sand, gravel or the like lying under water, said apparatus comprising the combination of
a dredger body,
a telescopic tube having a plurality of sections telescoping into one another, the upper end of said telescopic tube being fixed to said dredger body,
means for preventing the individual sections of said telescopic tube from twisting relative to each other,
a conveyor head attached to the lower end of said telescopic tube for collecting bulk material and directing it into said telescopic tube, said conveyor head being mounted for rotational movement about the axis of said telescopic tube, and
a flexible hose of fixed length extending through the interior of said telescopic tube and permitting telescoping movement of said tube sections thereover.

13. The dredging apparatus of claim 1 wherein said conveyor head is mounted for rotational movement about the axis of said telescopic tube, and which includes means for preventing the individual sections of said telescopic tube from twisting relative to each other.

14. The dredging apparatus of claim 12 which includes a hose reel mounted on said dredger body and connected to the upper end of said hose for winding and unwinding said hose during telescoping movement of the sections of said telescopic tube.

* * * * *